Sept. 29, 1925.
B. S. HARRINGTON
1,555,008
MEASURING AND FILLING MACHINE
Filed March 24, 1921    5 Sheets-Sheet 2
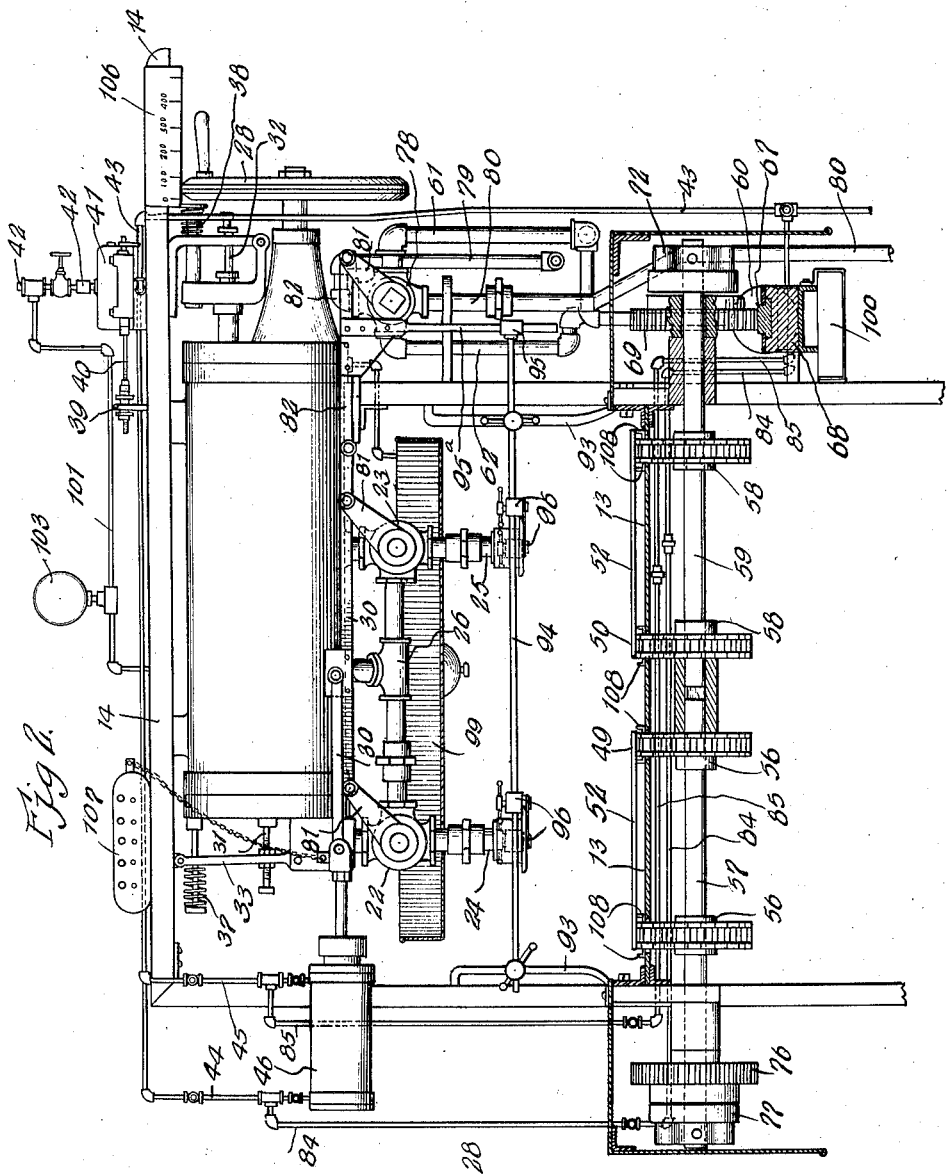
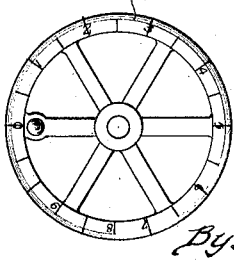

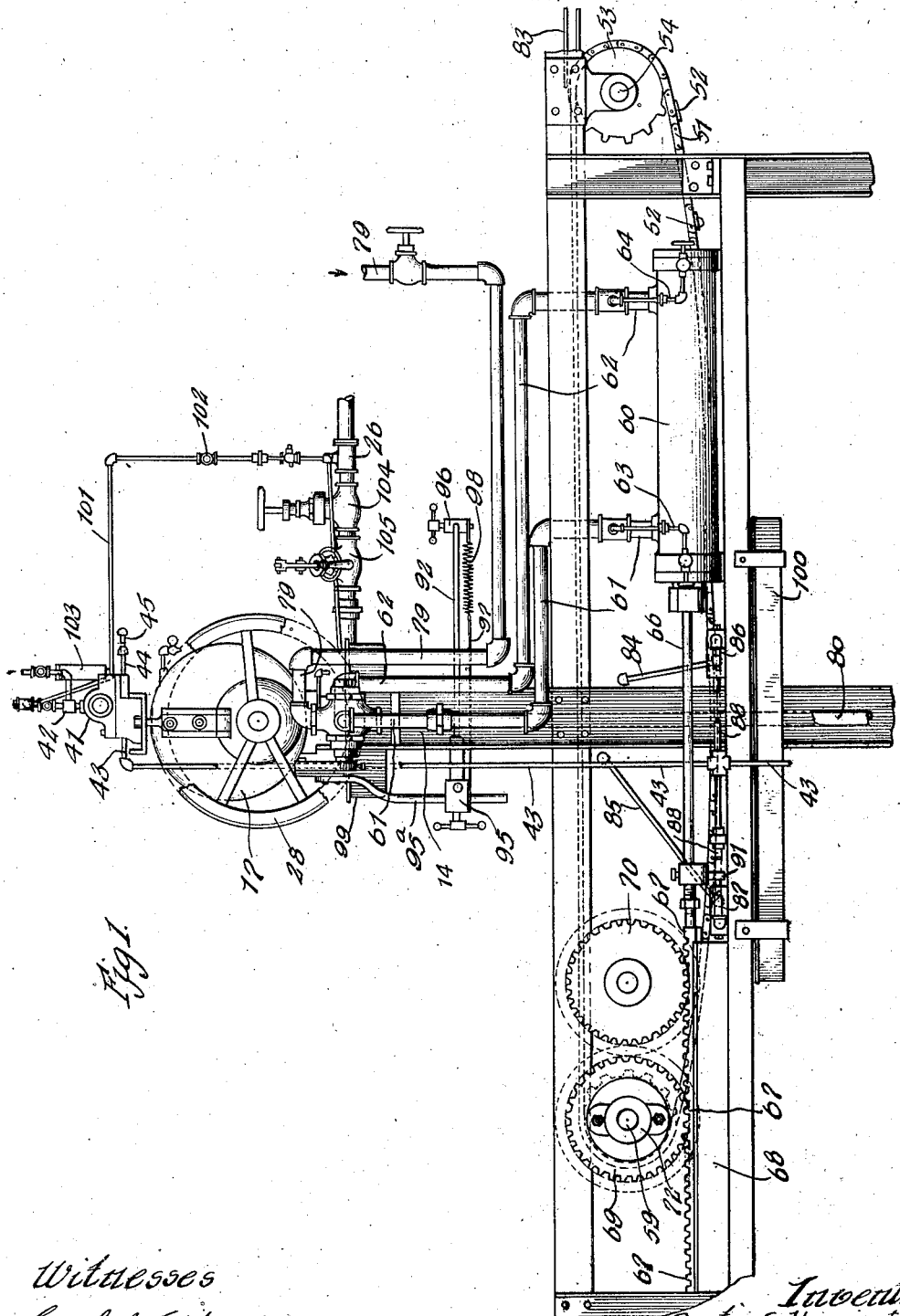

Sept. 29, 1925.
B. S. HARRINGTON
1,555,008
MEASURING AND FILLING MACHINE
Filed March 24, 1921  5 Sheets-Sheet 3
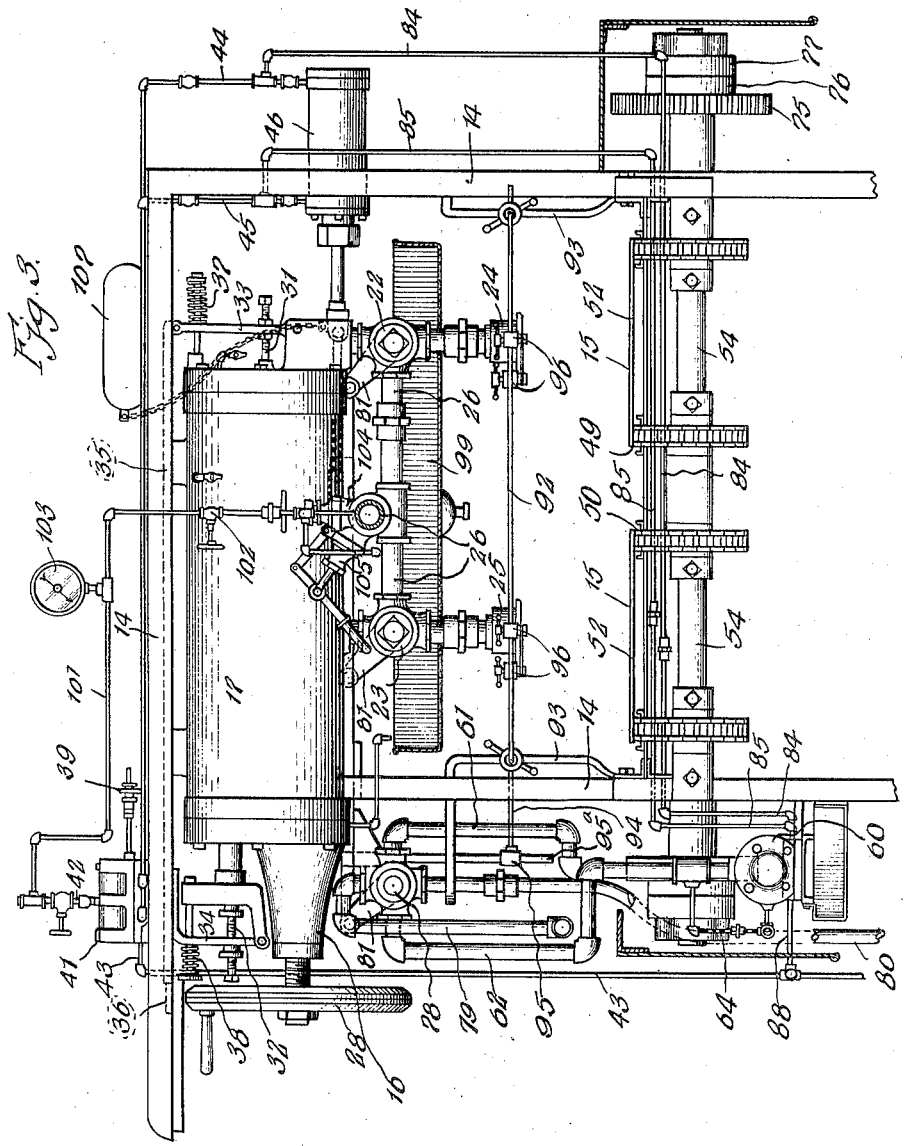

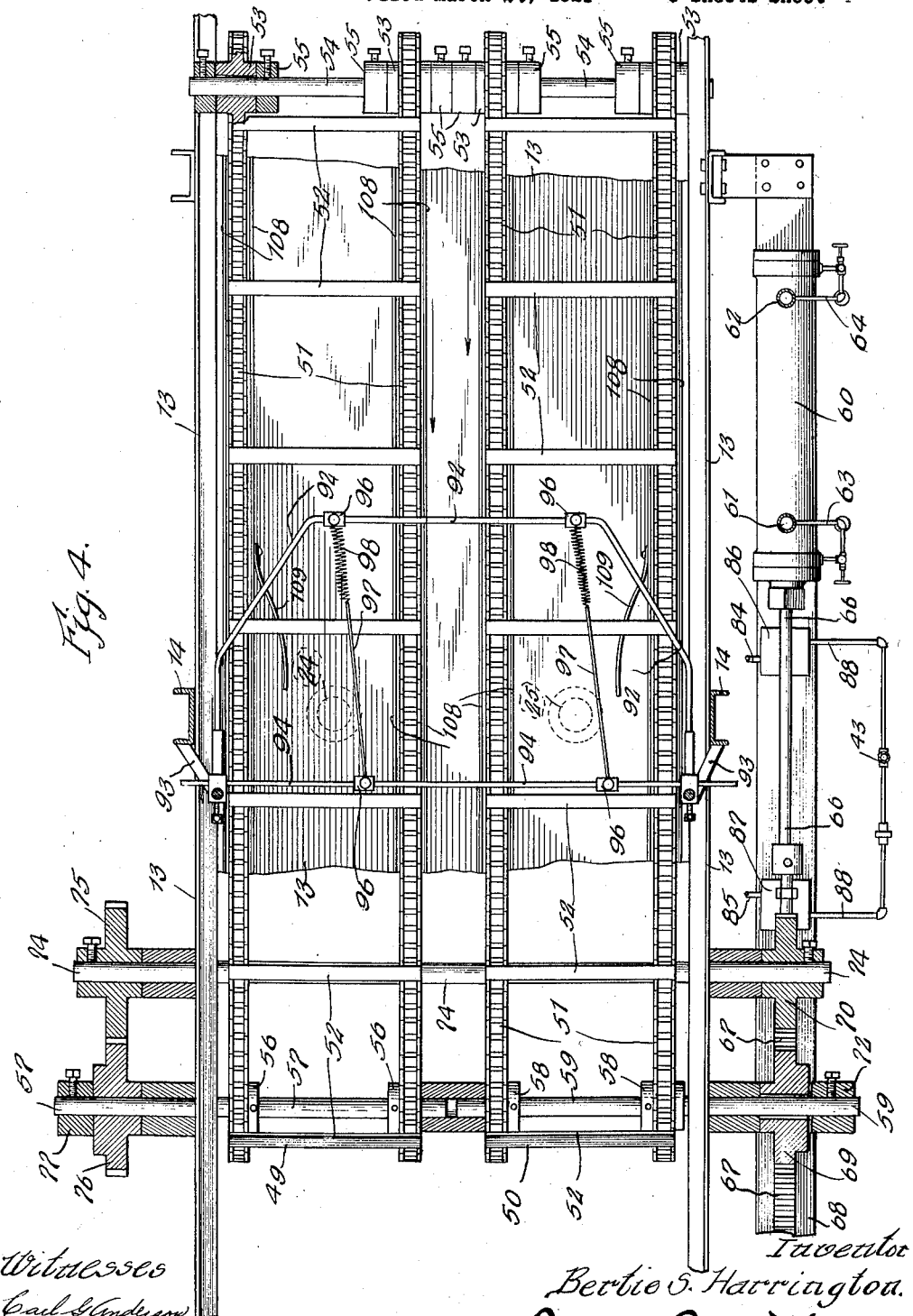

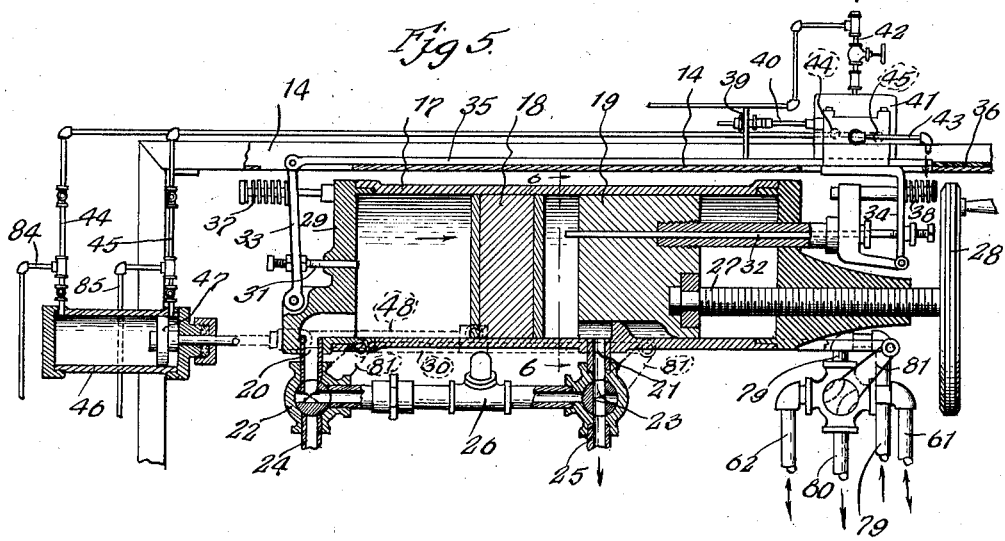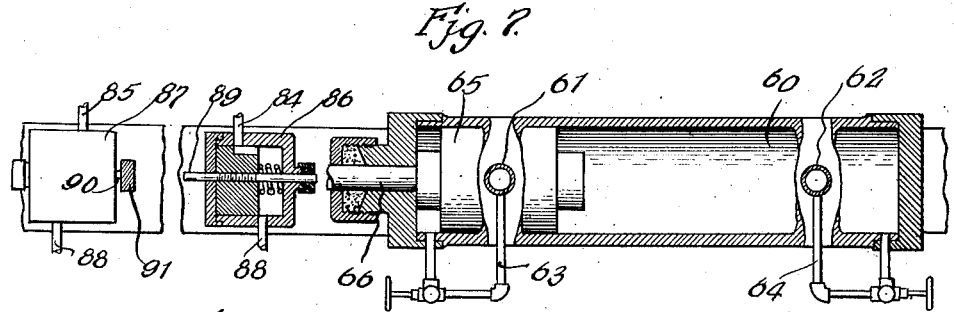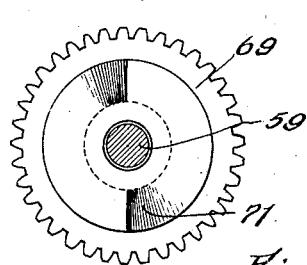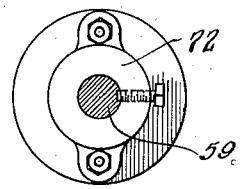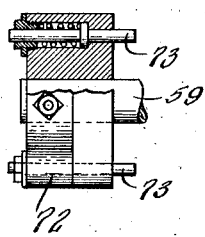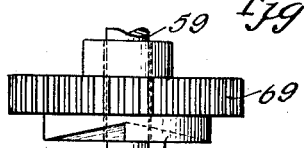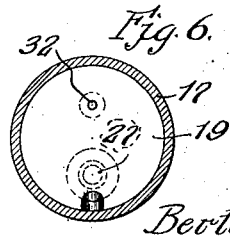

Patented Sept. 29, 1925.

1,555,008

UNITED STATES PATENT OFFICE.

BERTIE SHEFFIELD HARRINGTON, OF FORT WORTH, TEXAS.

MEASURING AND FILLING MACHINE.

Application filed March 24, 1921. Serial No. 455,008.

*To all whom it may concern:*

Be it known that I, BERTIE S. HARRINGTON, a citizen of the United States, residing at Forth Worth, in the county of Tarrant and State of Texas, have invented certain new and useful Improvements in Measuring and Filling Machines, of which the following is a specification.

This invention pertains in general to dispensing mechanisms, and more particularly has to do with an improved measuring, filling and receptacle-handling machine of the generic type disclosed in my Patent No. 1,482,467, dated Feb. 5, 1924.

While presenting at the same time distinct constructional improvements over the machine of the above mentioned pending application, the present invention also deals with novel additional features cooperatively combined therewith.

One of the principal purposes, therefore, of the invention is to provide an improved automatic, continuously discharging machine of the character described, adapted for use with substances in a fluid or semi-fluid state, such as oils, lard and the like.

Another important object is the provision in such a machine of means for preventing dripping of the dispensed substance from the discharge nozzles subsequent to the closing of the same.

Still another important object is to provide in a machine of this character means for preventing the discharge of the substance in case the receptacle-handling conveyors fail to function properly or with sufficient rapidity.

A further object of prime importance is the provision in such a machine of means for imparting variable speeds to the conveyors at different stages in their intermittent movements in order to do away with the sudden starts and stops of the conveyor and thereby prevent spilling of the substance contained in the filled receptacles.

Other objects and advantages of this invention will become apparent as the nature of the same is understood from the following detailed description based upon the accompanying drawings wherein is shown what is now considered to be a preferred embodiment of the invention. It is evident that the construction hereinafter set forth may be varied in minor details without materially changing the principles underlying this disclosure, and it should therefore be understood that this embodiment is not intended to restrict the spirit of the invention or to limit unnecessarily the scope of the claims.

In the drawings—

Fig. 1 is a side elevation of the machine;

Fig. 2 is an end elevation of the same as viewed from the left in Fig. 1;

Fig. 3 is another end elevation of the same as viewed from the right in Fig. 1;

Fig. 4 is a top plan view of the machine illustrating clearly the conveyor mechanism, the drip cut-off, the safety control for the dispensing mechanism, and the variable speed device for the conveyor or operating means. In this view the dispensing mechanism and certain other parts of the machine closely associated therewith have been omitted, the uprights supporting the same being broken away as shown;

Fig. 5 is a vertical longitudinal section through the dispensing mechanism and associated parts;

Fig. 6 is a vertical transverse section taken on the line 6—6 of Fig. 5;

Fig. 7 is an enlarged horizontal detail view of the conveyor operating cylinder and of both of the associated safety valves controlling the operation of the dispensing mechanism;

Figs. 8 and 9 are side and top detail views respectively of the conveyor ratchet wheels;

Figs. 10 and 11 are side and edge detail views respectively of the drum co-acting as ratchet with the ratchet wheels; and Fig. 12 is a face view of the calibrated wheel for adjusting or varying the unitary equal quantities of substance dispensed.

Referring now in detail to the drawings it will be noted that the machine of this invention includes a table portion 13 and a channelled supporting yoke 14. The table portion carries two parallel intermittently and alternately moving conveyors 15, while the supporting yoke has rigidly attached thereto above the conveyors the dispensing mechanism which is indicated generally by the numeral 16.

The dispensing mechanism is substantially the same in many respects as that disclosed in my previously mentioned pending application. In view of this the following description of the same is as brief as the circumstances justify. Having reference particularly to Fig. 5, the numeral 17 designates a cylinder which is closed at both ends and contains within its bore a free reciprocating piston 18 and a false longitudinally movable cylinder head or end 19. The cylinder is provided with two spaced vertical ports 20 and 21, each of which functions alternately as an inlet and exhaust. Two three-way rotary valves 22 and 23 are disposed below the cylinder and communicate upwardly with the aforesaid ports and downwardly with discharge nozzles 24 and 25. A common supply pipe 26 containing the substance under pressure to be dispensed is also in communication with both valves.

The position of the false head 19 is adjustable longitudinally of the cylinder by means of a screw-threaded spindle 27 which is rotatably secured at its inner end to the false head. The spindle engages with a threaded aperture in the adjacent cylinder end wall and exteriorly thereof is provided with a hand wheel 28. The free piston 18 reciprocates within the cylinder bore between the ports 20 and 21, the ends of its stroke being limited by the false head 19 and opposed cylinder end 29. By moving the position of the false head 19 the volume of the cylinder bore displaced by the piston in one stroke may be varied.

The three-way valves 22 and 23 are co-operatively connected by means of levers and a spacing link 30 in such angular relation that the shifting of the link 30 to the right, for instance, as shown in Fig. 5, puts port 20 of the cylinder in sole communication with the supply pipe 26, and port 21 in sole communication with its corresponding discharge nozzle 25. It will be evident that the shifting of the link 30 in the opposite direction puts port 20 in communication with its discharge nozzle 24, and port 21 in communication with the supply pipe 26.

The means provided for automatically shifting the link 30 when the free piston 18 reaches each end of its stroke will now be described. Tappet rods 31 and 32 are carried by the cylinder end 29 and the false head 19 respectively, and project inwardly into the path of the piston 18 in the cylinder bore. These rods act outwardly against pivoted levers 33 and 34. The upper end of the lever 33 is hinged to one end of a long bar 35 which is supported in the bottom of the channelled horizontal portion of the yoke 14; while the upper end of the lever 34 is L shaped and disposed closely adjacent the under side of said bar near the opposite end thereof. The extreme end of this bar is supported normally on a slightly elevated plate 36. When the piston has moved to the lefthand end of its stroke as viewed in Fig. 5, the tappet 31 moves the lever 33 outwardly against the action of a coil spring 37, causing the bar 35 to be shifted to the left, and its end to drop from the plate 36 and become locked against the abrupt edge thereof. This bar will be shifted back to its normal position again when the free piston 18 reaches the righthand end of its stroke and pushes the tappet rod 32 and indirectly the lever 34 outwardly against the action of a coil spring 38. This movement of the lever 34 causes the L shaped end thereof to lift the adjacent end of bar 35 and disengage the same from its locked engagement with the edge of the plate 36. The bar 35 will thereupon shift to the right under the pressure of the compressed spring 37.

The bar 35 carries rigidly thereon a forked upright member 39 which engages the valve operating stem 40 of a compressed air valve 41 disposed on the yoke 14. The previously described shifting of the bar 35 causes a like movement of the stem 40. The valve 41 is provided with a compressed air inlet 42, an exhaust 43 and two pipes 44 and 45 which connect with the opposite ends of an air cylinder 46. The valve is of a well known type and functions, when its stem 40 is shifted to the left, to put the pipe 44 in communication with the compressed air inlet 42, and the pipe 45 in communication with the exhaust 43; and, when shifted to the right, to put the pipe 45 in communication with the inlet 42, and the pipe 44 in communication with the exhaust 43. The air cylinder 46 contains a piston 47 the stem of which is secured by a connecting rod 48 to the previously mentioned link 30 at a medial point thereof.

From the foregoing description it will be appreciated that an automatic shifting of the three-way valves 22 and 23 occurs every time the free piston 18 reaches either end of its stroke, and equal quantities of the substance are dispensed from the discharge nozzles, first at one and then at the other, the size of these unitary quantities being determined by the position of the false head 19 in the cylinder 17.

The receptacle-handling mechanism comprises two parallel moving conveyors 49 and 50 mounted on the table portion 13 under the discharge nozzles 24 and 25, respectively, of the dispensing mechanism, and adapted to operate alternately in synchronization therewith. Referring particularly to Figs. 1 to 4 inclusive it will be noted that each conveyor comprises two spaced parallel chains 51 which are connected at regular intervals by rigid transverse slats 52.

At the right end of the machine, as viewed in Figs. 1 or 4, the chains of both conveyors pass over idling sprockets 53 which are freely mounted on a stationary transverse shaft 54. Collars 55 are fixedly disposed on this shaft on both sides of these sprockets to prevent lateral displacement of the same.

At the left end of the machine the chains of the conveyor 49 pass over sprockets 56 keyed to a short transverse shaft 57 which is journalled in bearings carried by the table portion 13, while the chains of the conveyor 50 pass over similar sprockets 58 keyed to a short transverse shaft 59 coaxial with the shaft 58 but rotatable in its bearings independently thereof. Rotation of the shafts 57 and 59 in a contra-clockwise direction, as viewed in Fig. 1, serves to move the conveyors 49 and 50 respectively, in the proper direction, indicated by the arrows in Fig. 4.

The mechanism for moving these conveyors alternately and intermittently in synchronization with the dispensing mechanism will now be set forth. At one side of the table portion 13 is located a water cylinder 60 which has pipes 61 and 62 leading into its bore at points spaced from the ends thereof. Short pipes 63 and 64 of greatly reduced cross-section connect with the pipes 61 and 62 respectively, near the cylinder, and open also into the cylinder bore but at the extreme ends thereof. This construction is shown clearly in Fig. 7. A comparatively long piston 65 is caused to reciprocate within the bore of the cylinder, serving when at either end of its stroke to cut off the main inflow or discharge of water through the pipes 61 or 62 as the case may be by covering the ends thereof. The piston, however, is provided with reduced end portions which prohibit the piston from moving into a position at either end of the cylinder in which it would cut off the lesser inflow or discharge of water through the small pipes 63 or 64.

It will be understood from this construction that when water under pressure is present in pipe 61 for instance and pipe 62 is therefore acting as a discharge, the piston 65, being acted on only by the water entering the cylinder through the small pipe 63 will move slowly to the right as viewed in Fig. 7. As soon as the piston uncovers the end of the pipe 61 however the full force of the water therein acts unrestrictedly on the piston and moves the same rapidly. On approaching the opposite end of the cylinder, the speed of the piston is reduced upon covering up the large effective outlet presented by the end of the pipe 62, since the water in front of the piston can then be exhausted but slowly through the small pipe 64. A similar three-speed cushioned movement of the piston occurs in the opposite direction when the functions of the pipes 61 and 62 as inlets and outlets, respectively, are reversed.

As best shown in Figs. 1 and 4, the piston rod 66 of the piston 65 is rigidly attached to a rack 67 which slides longitudinally in a channelled guide 68 carried on the machine frame. This rack meshes upwardly with and rotates two relatively independent gears 69 and 70, the first of which is loosely journalled on the previously mentioned shaft 59 and has formed on its outer face a ratchet wheel 71 which serves to rotate in a contra-clockwise direction only a cooperating ratchet-carrying drum 72 keyed to the shaft 59. The ratchets 73 of this drum are spring actuated, and are engaged by the ratchet wheel to move the conveyor 50 only when said ratchet wheel is rotated in a contra-clockwise direction by movement of the rack to the right. When the gear 69 is rotated in the opposite direction by movement of the rack to the left, the drum 72 and consequently the shaft 59 and conveyor 50 remain stationary. The gear 70 is keyed to a transverse shaft 74, which, at its opposite end, has a similar but slightly larger gear 75 keyed thereto. This gear is in mesh with a gear 76 of equal size which is loosely mounted on the shaft 57 and, like the gear 69, has a ratchet wheel formed on its outer face. A ratchet carrying drum 77, which is similar to the drum 72, is keyed to the shaft 57 and functions through its one-way ratchet engagement with the outer face of the gear 76, to rotate the conveyor shaft 57 in a contra-clockwise direction and consequently to move the conveyor 49 when the rack 67 is moved to the left.

From this construction it will be apparent that, when the water pipe 61 functions as an inlet to the cylinder 60 and the pipe 62 as an outlet, the conveyor 50 will be moved forward a distance corresponding to the interval between the slats 52; and that, when the water pipe 62 functions as an inlet and the pipe 61 as an outlet, the conveyor 49 will be moved forward an equal distance.

In order to synchronize the movements of the conveyors with the action of the dispensing mechanism the water cylinder pipes 61 and 62 enter a double-elbow four-way rotary valve 78 which is also connected to a water inlet pipe 79 and an exhaust pipe 80. This valve, which is clearly shown in Figs. 1, 2, 3 and 5 of the drawings, is operated by the movement of the link 30 in turning the three-way valves 22 and 23, an arm 81 of the water valve being connected by a rod 82 with said link. When turned to the right, as viewed in Fig. 5, the valve 78 puts the inlet pipe 79 in communication with the pipe 62 and the exhaust 80 in communication with the pipe 61, whereupon the conveyor 49 is moved forward under its then closed discharge nozzle 24. When turned to the left, the valve 78 puts the inlet pipe 79 in communication with the pipe 61 and the exhaust 80 in communication with the pipe 62, causing the conveyor 50 to likewise move forward under its then closed nozzle 25. In this manner the operation of the receptacle-handling mechanism is perfectly and automatically synchronized with that of the dispensing mechanism. The stroke of the piston 65 of the water cylinder being of just the proper length to move each of the conveyors forward a distance corresponding to the intervals between the slats 52 thereof. The empty receptacles are placed in front of these slats from a slightly elevated portion 83 of the table at the righthand end of the same, whereby the necessity of lifting the receptacles over the slats is obviated. This elevated portion 83 is shown only in Fig. 1.

A safety device to prevent operation of the dispensing mechanism until the conveyor under the dispensing nozzle then ready to discharge has fully completed its forward movement thereunder into its new position will now be described: Pipes 84 and 85 lead into the pipes 44 and 45 of the air cylinder 46. These pipes extend downwardly and open into similar but oppositely facing spaced plunger valves 86 and 87 which are located on the machine frame directly below and closely adjacent to the rack 67 and piston rod 66. Exhaust pipes 88 lead from the valves 86 and 87 and enter the common exhaust pipe 43 of the air valve 41. The valves 86 and 87 one of which is shown in detail in Fig. 7, maintain their respective pipes 84 and 85 in open communication with their exhausts, but close off the pipes 84 and 85 when operating plungers 89 and 90 are pressed inwardly. It will therefore be appreciated that no pressure can be built up in either end of the air cylinder 46 to operate the dispensing mechanism except when the corresponding pipe 84 or 85 as the case may be is closed off by pressing the plunger 89 or 90. A downwardly projecting finger 91 is carried by the piston rod 66, and, when the piston 65 reaches either end of its stroke serves to operate the plunger of the adjacent valve 86 or 87 and to maintain that valve closed until the next stroke of the rack. Thus, in the event that the water cylinder 60 fails to operate the rack 67 or is tardy in so doing because of weak water pressure or the like, the dispensing mechanism will automatically be caused to suspend operation during that time and until the receptacle-handling mechanism has properly functioned.

In order to prevent dripping of the substance from the discharge nozzles subsequent to each shutting off of the same, and to stop the flow from the nozzles abruptly whereby to allow faster operation of the machine, a cut-off device is provided. This device, which is clearly shown in Fig. 4, consists of a wide U shaped horizontal frame 92 which is rigidly attached at its sides to upright guide rods 93 carried by the vertical portions of the yoke 14. The height of this frame above the table portion 13 may be adjusted by loosening set screws which secure the same to the guide rods.

The spaced free ends of the frame have slidably mounted therein a rod 94. A sleeve 95 is attached to one end of the rod 94 and receives the lower end of a vertical arm 95$^a$ which is fixedly carried by the previously mentioned rod 82. It will be evident from this construction that every time the rod 82 shifts in turning the water valve 78 the rod 94 will be shifted laterally of the machine in its frame 92. Attaching brackets 96 are carried by the frame 92 and rod 94, and serve to hold the ends of wires 97 stretched therebetween. Coil springs 98 are inserted in the wire lengths in order to maintain a tension at all times on the wires and thereby prevent slack. When the rod 94 is in the position shown in the drawings, the brackets are set on the rod and frame so that when the rod is shifted the wires will cut across the bottoms of the discharge nozzles. A similar operation will of course occur when the rod is shifted back again. When the machine is being used with substances in a fluid rather than in a semi-fluid state, other more suitable means may advantageously supplant the wires which are here shown for use with lard and like substances.

Drip pans 99 and 100 may be disposed respectively under the valves of the dispensing cylinder 17 and under the rack and safety valves 86 and 87 to catch excess lubricating oil.

In order to remove the last unitary quantity of substance from the machine after stopping same, a pipe 101 leads from the compressed air pipe 42 to the supply pipe 26. When a globe valve 102 (see Figs. 1 and 3) is opened in pipe 101 and the supply pipe 26 closed off farther up the line the compressed air fills the dispensing cylinder in place of the substance and discharges the substance still remaining therein. Ordinarily the pipe 101 serves merely as a lead to an air gauge 103.

The flow of substance to the machine may be regulated by a globe valve 104 disposed in the pipe 26. A quick shut-off gate valve 105 is also located in this pipe however to stop the operation of the machine instantaneously when desired.

As shown in Fig. 2 a scaled plate 106 is attached to the yoke 14 above the hard wheel 28, and a peripheral mark on the wheel indicates on the scale the size of the unitary quantities of substance being dispensed. One side of the hand wheel 28 is angularly subdivided in order that a very accurate micrometer adjustment of the quantities may be accomplished. This marking is illustrated in Fig. 12.

A counter 107 may be located on the yoke 14 as shown in Fig. 2, to tally the number of unitary quantities of substance dispensed. When attached as here shown the counter should of course be set to record in multiples of two.

The chains 51 of the conveyors move along the surface of the table between parallel guide strips 108. Just before reaching positions under the nozzles 24 and 25, the empty receptacles are shifted toward the inner sides of their respective conveyors against the adjacent guide strips 108 by laterally deflecting guides 109 attached to the table portion. In this manner the receptacles are automatically centered below the nozzles as the conveyors move forward.

The operation of the complete machine will now be summarized. We will assume that the various cooperating mechanisms of the invention are in the positions illustrated in the drawings, and that the substance under pressure from pipe 26 is moving the free piston 18 to the right as indicated in Fig. 5 by the arrow, causing the substance to the right of the piston to discharge through the nozzle 25. As the piston 18 reaches the end of its stroke the tappet rod 32 is pressed against the lever 34, the horizontal bar 35 is thereby raised from its locked engagement with the edge of the plate 36 and shifted to the right by the action of the spring 37, the upright member 39 shifts the valve 41, and the piston 47 is forced to the left since the valve 87 is at this time being held closed as shown in Fig. 7. The shifting of the piston 47 serves to constitute of port 21 an intake, of port 20 a discharge through nozzle 24, and simultaneously turns the water valve 78 causing the pipe 61 to now become an inlet to the water cylinder 60 and pipe 62 an outlet, whereupon piston 65 moves to the right and conveyor 50 is caused to move forward under the now closed nozzle 25. As soon as the conveyor 50 reaches its fully forward position the plunger valve 86 is closed to permit the next operation of the air cylinder 46. At the same time that the valves 22, 23 and 78 are turned the cut off wires 97 are passed across the ends of the discharge nozzles 24 and 25. Due to the variable three-speed movement of the piston 65 in the water cylinder 60, the conveyors are moved without abrupt starting and stopping jerks, the cushioned movement imparted in this way to them serving to prevent any spilling of the substance in the filled receptacles carried thereby. This completes one cycle of the machine's operation, and leaves the various mechanisms in proper position for continuous automatic operation.

I claim:

1. In a measuring and dispensing apparatus, an intermittently discharging nozzle of a measuring device, an intermittently moving conveyer for positioning receptacles below the nozzle, and means for moving the conveyor after each discharge of the nozzle to remove the filled receptacle, said means including a source of fluid under pressure, a cylinder, a piston in the cylinder connected with the conveyor, and means for feeding the fluid into the cylinder in an increasing flow, whereby to cause the piston to move the conveyor at an initially slow rate of speed to prevent spilling of the filled receptacle being removed.

2. In a measuring and dispensing apparatus, two alternately discharging nozzles of a measuring device, two alternately moving conveyors associated respectively with the nozzles for positioning receptacles below the same, and means for moving each conveyor after each discharge operation of its associated nozzle to remove the filled receptacle, said means including a source of fluid under pressure, a cylinder, a piston in the cylinder connected with the conveyors to move the same alternately upon successive strokes, and means for feeding the fluid into the cylinder in an increasing flow, whereby to cause the piston to move each of the conveyors in turn at an initially slow rate of speed to prevent spilling of the filled receptacles being removed.

3. In a measuring and dispensing apparatus, the combination with alternately discharging nozzles of a measuring device, of means for positioning receptacles below the nozzles comprising intermittently and alternately moving conveyors, and mechanism for operating the conveyors including a cylinder and piston, two pipes each of which is adapted to connect alternately with a source of fluid under pressure and with an exhaust leading into the cylinder at points spaced from the ends, and two pipes of relatively smaller cross-sectional area connecting the extreme ends of said cylinder with the first mentioned pipes, the speed of each conveyor during its movement being characterized by an acceleration and a retardation.

4. In a measuring and dispensing apparatus, the combination with a measuring device having alternately discharging nozzles, and mechanism for operating the same, of means for positioning receptacles below the nozzles comprising intermittently and alternately moving conveyors, means for operating said conveyors, and means for preventing functioning of the operating mechanism of the measuring device, said means being held inoperative by the conveyor-operating means upon completion of each conveyor movement.

5. In a measuring and dispensing apparatus, the combination with a measuring device having alternately discharging nozzles, and mechanism for operating the same, of means for positioning receptacles below the nozzles comprising intermittently and alternately moving conveyors, means for operating said conveyors including a reciprocating member, and valves adapted when open to prevent functioning of the operating mechanism of the measuring device, said valves being held closed upon completion of each conveyor movement by valve-operating means carried by said reciprocating member.

6. In a measuring and dispensing apparatus, the combination with a measuring device having alternately discharging nozzles, and mechanism for operating the same, of means for positioning receptacles below the nozzles comprising intermittently and alternately moving variable speed conveyors, means for operating said conveyors including a reciprocating member, and valves adapted when open to prevent functioning of the operating mechanism of the measuring device, said valves being held closed upon completion of each conveyor movement by valve-operating means carried by said reciprocating member.

7. In a measuring and dispensing apparatus, the combination with a measuring device having alternately discharging nozzles, and mechanism for operating the same, of means for abruptly cutting off the flow of substance from each nozzle upon the closing of the same, means for positioning receptacles below the nozzles comprising intermittently and alternately moving variable speed conveyors, means for operating said conveyors, and means for preventing functioning of the operating mechanism of the measuring device, said means being held inoperative by the conveyor-operating means upon completion of each conveyor movement.

8. In a measuring and dispensing apparatus, the combination with a measuring device having a discharge nozzle, and mechanism for operating the same, of means for positioning receptacles below the nozzle comprising an intermittently moving conveyor, means for operating said conveyor, and means for preventing functioning of the operating mechanism of the measuring device, said means being held inoperative by the conveyor operating means upon completion of each conveyor movement.

9. In a measuring and dispensing apparatus, an intermittently discharging nozzle of a measuring device, an intermittently moving conveyor for positioning receptacles below the nozzle, means including a source of power for operating the measuring device to effect a discharge from the nozzle, means including another source of power for operating the conveyor to place a receptacle below the nozzle to receive the discharge, and a safety device for preventing the discharge-operating means from functioning until after the conveyor-operating means has completed functioning.

10. In a measuring and dispensing apparatus, an intermittently discharging nozzle of a measuring device, an intermittently moving conveyor for positioning receptacles below the nozzle, means including a cylinder adapted to contain fluid under pressure for operating the measuring device to effect a discharge from the nozzle, means for operating the conveyor to place a receptacle below the nozzle to receive the discharge, and a valve controlled by the conveyor-operating means for releasing the pressure in the cylinder while the conveyor-operating means is functioning so that the discharge-operating means cannot begin to function before the conveyor-operating means has completed functioning.

In testimony whereof I have hereunto subscribed my name.

BERTIE SHEFFIELD HARRINGTON.